United States Patent [19]
Kanetake

[11] Patent Number: 5,410,445
[45] Date of Patent: Apr. 25, 1995

[54] SOLID ELECTROLYTIC CAPACITOR
[75] Inventor: Yasuo Kanetake, Kyoto, Japan
[73] Assignee: Rohm Co., Ltd., Kyoto, Japan
[21] Appl. No.: 235,808
[22] Filed: Apr. 29, 1994
[30] Foreign Application Priority Data
  May 12, 1993 [JP] Japan .................. 5-110579
[51] Int. Cl.6 ............................... H01G 9/00
[52] U.S. Cl. .................... 361/539; 361/528
[58] Field of Search ............... 361/301.3, 303, 306.1,
  361/539, 540, 272, 275.2, 275.4, 830, 821, 523,
  528, 537, 533, 534, 535, 538–541; 338/324;
  174/52.2; 29/25.03, 25.42

[56] References Cited
U.S. PATENT DOCUMENTS
  4,064,611  12/1977  Sobozenski et al. ............ 29/25.03

FOREIGN PATENT DOCUMENTS
  60-220922  11/1985  Japan .
  0265418    11/1988  Japan ..................... 361/534
  0066925    3/1989   Japan ..................... 361/534
  0201912    8/1989   Japan ..................... 361/538
  2-63525    5/1990   Japan .
  0020014    1/1994   Japan ..................... 361/538

Primary Examiner—Bruce A. Reynolds
Assistant Examiner—Michael D. Switzer
Attorney, Agent, or Firm—William H. Eilberg

[57] ABSTRACT

A solid electrolytic capacitor is provided which comprises a capacitor element including a chip and an anode wire projecting from the chip, an anode lead electrically connected to the anode wire, a cathode lead electrically connected to the chip, and a resin package enclosing the capacitor element together with part of the anode and cathode leads. The resin package has a first end face from which the cathode lead projects out, and a second end face located adjacent to the anode lead. Each of the anode and cathode leads is bent outside the package toward the underside thereof. The resin package includes a larger width portion adjacent to the first end face and a smaller width portion adjacent to the second end face. The anode lead extends transversely of the anode wire and projects laterally from the smaller width portion.

5 Claims, 3 Drawing Sheets

SOLID ELECTROLYTIC CAPACITOR

BACKGROUND OF THE INVENTION

1. Field of the Invention

This invention relates to a solid electrolytic capacitor, such as tantalum capacitor or aluminum capacitor, which comprises a capacitor element enclosed in a resin package. More particularly, the present invention relates to a solid electrolytic capacitor of the type wherein an anode and a cathode leads are bent outside a resin package toward the underside thereof for conveniently mounting to a surface of a printed circuit board.

2. Description of the Related Art

A solid electrolytic capacitor is known from Japanese Patent Application Laid-open No. 60(1985)-220922 for example. The capacitor disclosed in this Japanese document has such a structure as shown in FIGS. 6 and 7.

Specifically, the prior art capacitor comprises a capacitor element 1 which includes a capacitor chip 1a and an anode wire 1b projecting from the chip 1a. The capacitor also includes an anode lead 2 in electrical connection with the anode wire 1b, and a cathode lead 3 in electrical connection to the chip 1a. The capacitor element together with part of the respective leads 2, 3 is enclosed in a resin package 4, and the respective leads 2, 3 are bent toward the underside of the resin package 4 for conveniently mounting to a surface of a circuit board (not shown).

According to the prior art arrangement, the resin package 4 together with the projecting portions of the respective leads 2, 3 is symmetric with respect to a central plane transverse to the anode wire 1b. Therefore, the polarity of the capacitor is not visually recognizable, so that the capacitor may be erroneously mounted on a circuit board (not shown) in a reverse polarity. The capacitor thus erroneously mounted generates a lot of heat, consequently damaging the capacitor and it related components in a critical way.

As shown in FIG. 8, the polarity of the capacitor may be rendered visually recognizable by forming a slot 5 in the anode lead 2 and/or by forming a marking 6 on the upper surface of the resin package 4. However, the slot 5 is not readily recognizable due to its small size, whereas the marking 6 is not recognizable from below the capacitor.

Japanese Utility Model Application Laid-open No. 2(1990)-63525 discloses a solid electrolytic capacitor wherein a pair of anode wires (or both ends of a single anode wire) are made to project from two faces of a capacitor chip in electrical connection with a corresponding pair of anode leads while a single cathode lead is electrically connected to the chip. Thus, the two anode leads combined with the single cathode lead provide visual recognition as to the polarity of the capacitor.

However, due to the provision of the two anode wires projecting from the capacitor chip, the volume of the capacitor must be sufficiently enlarged to entirely enclose the anode wires, thereby resulting in a size increase. Further, since the respective leads are bent toward and concealed by the underside of the resin package, the visual recognition as to the polarity of the capacitor is inconvenient from above the capacitor. Moreover, since the anode leads project laterally from the resin package, though to a relatively small degree by bending toward the underside of the package, it is inevitable that the overall size of the capacitor inclusive of the package and the leads be correspondingly increased.

SUMMARY OF THE INVENTION

It is, therefore, an object of the present invention to provide a solid electrolytic capacitor the polarity of which is readily recognizable both from above and below without the need for a size increase or a capacitance reduction.

According to the present invention, there is provided a solid electrolytic capacitor comprising: a capacitor element including a chip and an anode wire projecting from the chip; an anode lead electrically connected to the anode wire; a cathode lead electrically connected to the chip; and a resin package enclosing the capacitor element together with part of the anode and cathode leads, the resin package having a first end face from which the cathode lead projects out, the resin package further having a second end face located adjacent to the anode wire, each of the anode and cathode leads being bent outside the package toward the underside thereof; wherein the resin package includes a larger width portion adjacent to the first end face and a smaller width portion adjacent to the second end face, the anode lead extending transversely of the anode wire and projecting laterally from the smaller width portion.

The smaller width portion of the resin package may have a pair of inclined lateral faces which approach each other toward the second end face of the resin package. Alternatively, the smaller width portion of the resin package is stepped relative to the larger width portion.

Preferably, the anode lead may be entirely contained in the width of the larger width portion of the resin package. Further, the anode lead may have an intermediate portion connected to the anode wire and project from the smaller width portion of the resin package on both sides thereof.

Other objects, features and advantages of the present invention will be fully understood from the following detailed description given with reference to the accompanying drawings.

DETAILED DESCRIPTION OF THE PREFERRED EMBODIMENTS

Figure 1:
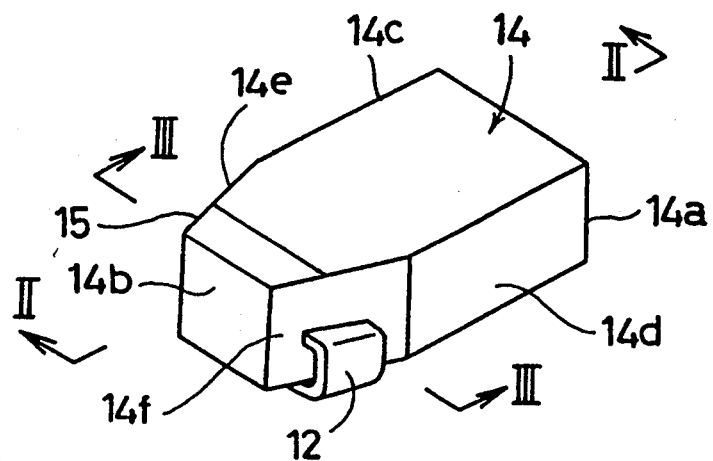
FIG. 1 is a perspective view showing a solid electrolytic capacitor embodying the present invention.

Referring first to FIGS. 1 to 4 of the accompanying drawings, there is shown a solid electrolytic capacitor according to a first embodiment of the present invention. The capacitor may be a tantalum capacitor or an aluminum capacitor for example.

The capacitor of the first embodiment comprises a capacitor element 11 which includes a chip 11a and an anode wire 11b projecting from the chip 11a. The chip 11a may be a compacted mass of tantalum powder for example, in which case the anode wire 11b is also made of tantalum.

The capacitor also includes an anode lead 12 and a cathode lead 13, each of which is in the form of a metal plate. The anode lead 12 is electrically connected, at an intermediate portion thereof, to the anode wire 11b by welding for example. The cathode lead 13 has an inner end electrically connected directly to the chip 11a. Alternatively, the cathode lead 13 may be electrically connected to the chip 11a via an unillustrated safety fuse (e.g. a temperature fuse or an overcurrent fuse).

The capacitor element 11 together with part of the respective leads 12, 13 are enclosed in a package 14 of a thermosetting resin (epoxy resin for example). The remaining portions of the respective leads 12, 13 are bent toward the underside of the resin package 14 (see FIGS. 1-3) for conveniently mounting to a surface of a printed circuit board (not shown).

Figure 2:
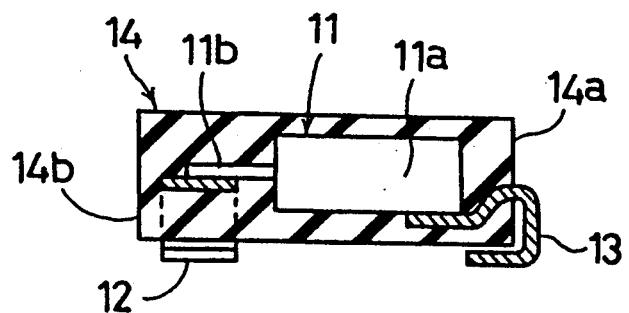
FIG. 2 is a sectional view taken on lines II—II in FIG. 1.

According to the illustrated embodiment, the resin package 14 has a first end face 14a from which the cathode lead 13 projects out, and a second end face 14b located closer to the anode wire 11b in opposition to the first end face 14a. The resin package 14 also has an opposite pair of lateral faces 14c, 14d parallel to each other, and a pair of inclined lateral faces 14e, 14f approaching each other toward the second end face 14b, as shown in FIGS. 1 and 2. Thus, the width of the resin package 14 reduces from the parallel lateral faces 14c, 14d toward the second end face 14b.

Figure 3:
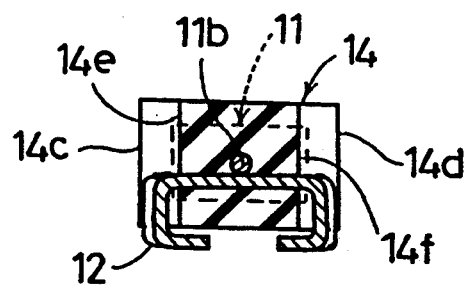
FIG. 3 is a sectional view taken on lines III—III in FIG. 1.
Figure 4:
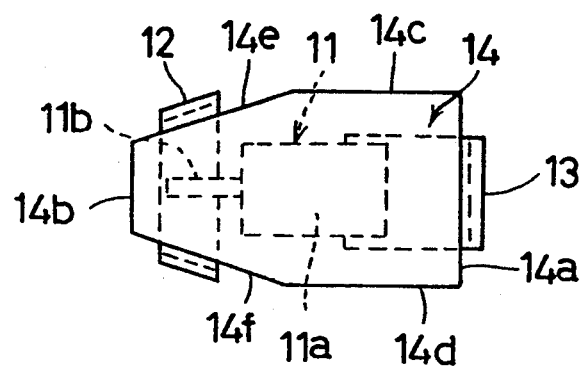
FIG. 4 is a plan view showing the capacitor.

As illustrated in FIGS. 3 and 4, the anode lead 12 is made to extend transversely of the anode wire 11b in electrical connection therewith. As a result, the anode lead 12 projects from the respective inclined lateral faces 14e, 14f. Alternatively, the anode lead 12 may be made to project only from one of the inclined lateral faces 14e, 14f.

According to the arrangement described above, the resin package 14 together with the respective leads 12, 13 is asymmetric with respect to a central plane perpendicular to the anode wire 11b. Thus, the polarity of the electrolytic capacitor is readily recognizable either from above or below the capacitor. As shown in FIG. 1, the resin package 14 may be provided with a marking 15 as an additional indication of the polarity, thereby making it even easier to recognize the polarity from above the capacitor.

Further, according to the illustrated embodiment, the anode lead 12 extends transversely of the anode wire 11b for providing the asymmetric configuration. Nevertheless, since the inclined lateral faces 12e, 12f of the resin package 14 are provided on both sides of the anode wire 11b adjacent to the second end face 14b of the package 14, the anode lead 12 bent toward the underside of the resin package 14 does not project beyond the parallel lateral faces 14c, 14d, as illustrated in FIGS. 3 and 4. As a result, the size of the capacitor as a whole does not increase despite the transverse extending direction of the anode lead 12.

On the other hand, if the inclined lateral faces 14e, 14f are not provided, the resin package 14 together with the capacitor chip 11a must be reduced in width to compensate for a size increase which would result from the fact that the anode lead 12 projects laterally beyond the parallel lateral faces 14c, 14d even after bending toward the underside of the package 14. Therefore, the capacitance of the capacitor must be correspondingly reduced.

The illustrated embodiment takes acount of the fact that a portion of the resin package 14 surrounding the anode wire 11b inherently has a more-than-enough thickness in comparison with another portion of the package surrounding the capacitor chip 11a. The inclined lateral faces 14e, 14f of the package 14 are provided by utilizing this more-than-enough thickness portion of the package.

Figure 5:
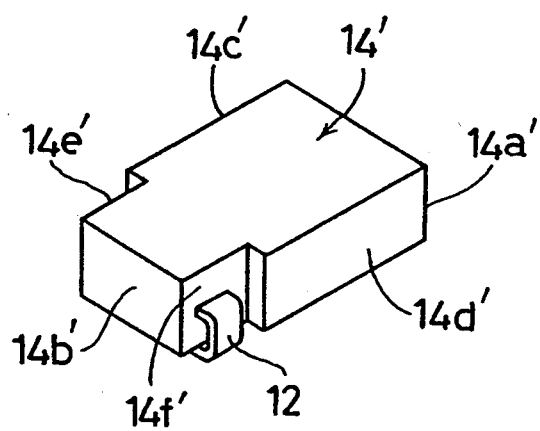
FIG. 5 is a perspective view showing another solid electrolytic capacitor embodying the present invention.
Figure 6:
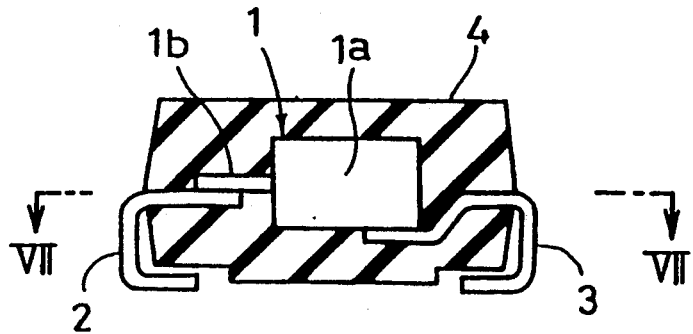
FIG. 6 is a view, in vertical section, showing a prior art solid electrolytic capacitor.
Figure 7:
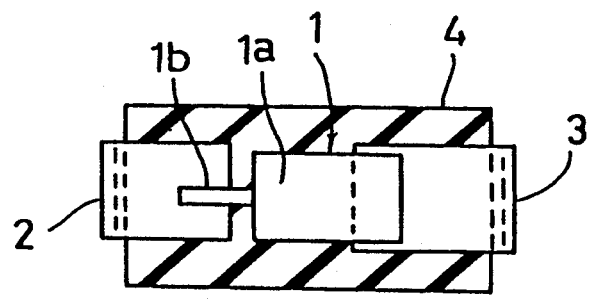
FIG. 7 is a sectional view taken along lines VII—VII in FIG. 6.
Figure 8:
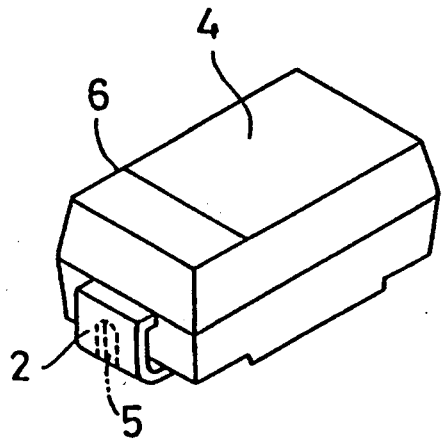
FIG. 8 is a perspective view showing the same prior art capacitor.

FIG. 5 shows a solid electrolytic capacitor according to a second embodiment of the present invention. Similarly to the first embodiment, the capacitor of this embodiment comprises a resin package 14' which has a first end face 14a', a second end face 14b' opposite to the first end face 14a', and an opposite pair of lateral faces 14c', 14d' parallel to each other. An unillutrated cathode lead projects from the first end face 14a' (cf. FIGS. 2 and 4).

According to the second embodiment, on the other hand, the resin package 14' has a pair of stepped lateral faces 14e', 14f' which are shifted laterally inwardly toward each other in comparison with the parallel lateral faces 14c', 14d'. Thus, the width of the resin package 14' reduces abruptly at the stepped lateral faces 14e', 14f', and an anode lead 12 is made to project from one or both of the stepped lateral faces.

Apparently, the resin package 14' of the second embodiment together with the respective leads is asymmetric with respect to a central transverse plane, thereby facilitating polarity recognition from above and below the capacitor. Further, the width reduction provided by the stepped lateral faces 14e', 14f' prevents a size increase of the capacitor while also preventing a capacitance decrease.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

I claim:
1. A solid electrolytic capacitor comprising:
   a capacitor element including a chip and an anode wire projecting from the chip;
   an anode lead electrically connected to the anode wire;
   a cathode lead electrically connected to the chip; and
   a resin package enclosing the capacitor element together with part of the anode and cathode leads, the resin package having a first end face from which the cathode lead projects out, the resin package further having a second end face located adjacent to the anode wire, each of the anode and cathode leads being bent outside the package toward the underside thereof;
   wherein the resin package includes a larger width portion adjacent to the first end face and a smaller width portion adjacent to the second end face, the smaller width portion having a pair of lateral faces, the anode lead extending transversely of the anode wire and projecting laterally from at least one of the lateral faces of the smaller width portion.
2. The capacitor according to claim 1, wherein the lateral faces of the smaller width portion of the resin package are inclined to approach each other toward the second end face of the resin package.

3. The capacitor according to claim 1, wherein the lateral faces of the smaller width portion of the resin package are stepped relative to the larger width portion.

4. The capacitor according to claim 1, wherein the anode lead has an intermediate portion connected to the anode wire and projects from both lateral faces of the smaller width portion of the resin package.

5. The capacitor according to claim 1, wherein the larger width portion of the resin package has a first width, and wherein the anode lead and the smaller width portion of the resin package together have a second width, and wherein the first width is at least as great as the second width.

* * * * *